US008261242B2

(12) United States Patent
Booth et al.

(10) Patent No.: US 8,261,242 B2
(45) Date of Patent: Sep. 4, 2012

(54) ASSISTING DEBUG MEMORY TRACING USING AN INSTRUCTION ARRAY THAT TRACKS THE ADDRESSES OF INSTRUCTIONS MODIFYING USER SPECIFIED OBJECTS

(75) Inventors: Alan E. Booth, Cary, NC (US); James E. Fox, Apex, NC (US); Venkataraghavan Lakshminarayanachar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 12/135,446

(22) Filed: Jun. 9, 2008

(65) Prior Publication Data

US 2009/0307667 A1    Dec. 10, 2009

(51) Int. Cl.
*G06F 11/36* (2006.01)
(52) U.S. Cl. .................. 717/128; 717/126; 717/127
(58) Field of Classification Search ................ 717/124, 717/125, 127, 128, 130
See application file for complete search history.

(56) References Cited

U.S. PATENT DOCUMENTS

| | | | | | |
|---|---|---|---|---|---|
| 5,960,198 | A | * | 9/1999 | Roediger et al. | 717/130 |
| 6,351,845 | B1 | * | 2/2002 | Hinker et al. | 717/128 |
| 2004/0153997 | A1 | * | 8/2004 | Anderson et al. | 717/127 |

OTHER PUBLICATIONS

Hofer, "Design and Implementation of a Backward-In-Time Debugger",Lecture Notes in Informatics, vol. P-88, 2006, pp. 17-32.*

* cited by examiner

*Primary Examiner* — Li Zhen
*Assistant Examiner* — Duy Khuong Nguyen
(74) *Attorney, Agent, or Firm* — Patents on Demand P.A.; Brian K. Buchheit; Scott M. Garrett

(57) ABSTRACT

The present invention discloses a solution for increasing the immediacy in determining a point of failure after an unexpected program termination. In the solution, a user determined object is identified by a user at compile time, where the identified object is one to be tracked. The compiler introduces executable code into the source code which is able to track modifications made to the object members during run-time. During execution, the address of each instruction modifying to the object is stored in an instruction pointer (IP) array associated with the tracked object. The IP array is continuously updated during program execution when an instruction modifies a member of the tracked object. When an unexpected program termination occurs, the instruction pointer array can be presented to a debugging agent to assist in determining the instruction causing the termination. The debugging agent can be a human agent, debugging software, report generation software, and the like.

13 Claims, 4 Drawing Sheets

200B

```
typedef struct struct_A {        210B
int num;
char c;
} mystruct;
```

```
num (mystruct *p) {        220B
p->num = 99;
p->c = 'A';
}
```

```
typedef struct struct_A {        230B
int num;
char c;                          232B
Instraddr track_struct_A[];
} mystruct;
```

240B

| Instr address | C code        | Asm Code                                  |
|---------------|---------------|-------------------------------------------|
| 0x12345       | p->num = 99;  | move [reg1+0],0x63              244B    |
| 0x12349       |               | move [reg3+n],Instruction_Pointer          |
| 0x1234D       | p->c = 'A';   | move [reg2+4], 0x41                       |
| 0x12351       |               | move [reg3+n+4],Instruction_Pointer        |

Where: reg1 - holds struct member 'num'
       reg2 - holds struct member 'A'
       reg3 - holds the Instaddr array namely - 'track_struct_A'

270B

```
origin    length    offset    textsize  sectsize  linkdate
02800000  000B3000  01A3EB08  000A0968  000A5A40  20020305  Debug_Help_Lib
040D0000  003A9000  02AF1B08  001CC288  0038F828  20070708  Compiler_Lib
04A40000  0001A000  033A8B08  0000E9F0  00014CC4  20070708  Network_Lib
04A60000  0000C000  033C2B08  00005A70  00007F4A  20070708  Network_Lib
```

FIG. 2B

ASSISTING DEBUG MEMORY TRACING USING AN INSTRUCTION ARRAY THAT TRACKS THE ADDRESSES OF INSTRUCTIONS MODIFYING USER SPECIFIED OBJECTS

BACKGROUND OF THE INVENTION

The present invention relates to the field of and software debugging, more particularly, to assisting debug memory tracing using an instruction array that tracks the addresses of instructions modifying user specified objects.

Today's software programs are becoming increasingly sophisticated and complex. As a result, unexpected program termination, sometimes referred to as a crash, is not an uncommon occurrence. A common cause of crashes is result of memory errors often called access violations. These errors occur when program variables and/or objects loaded in memory become corrupt, are uninitialized, or are populated incorrectly. When a program crashes, a core file can be generated containing vital information about the program's state at the time of failure. While this does provide a window into the cause of the problem, debugging the problem can still be quite a frustrating process. Often it is difficult or infeasible to reproduce the condition which produced the crash, resulting in a complex mystery. Many times the only information that is available is the name and location of the variable or object that the access violation occurred on and addresses of functions/objects/pointers present in the program. As a result, most of the effort of analysis is in debug code to find where an incorrect object set occurs.

In C programs, structures are a frequently used data type which can have multiple member entities. These entities can be modified by functions within the program during execution. Often times, when the program fails, a structure member has been incorrectly set by a function (e.g. instruction). After the crash happens, it can be extremely difficult to determine which function modifying the structure member resulted in the crash. Debugging programs requires tracing memory addresses of instructions and/or pointers to a point of failure. Many times functions are accessed by pointers which have different addresses from the functions. Consequently, the debugging process is often reduced to following a breadcrumb trail of pointers and function addresses until the offending instruction is found. This process is inefficient and does not perform well in environments requiring rapid solutions.

BRIEF DESCRIPTION OF THE SEVERAL VIEWS OF THE DRAWINGS

FIG. 2B is a code listing illustrating implementation details associated with the scenario presented in FIG. 2A in accordance with an embodiment of the inventive arrangements disclosed herein.

DETAILED DESCRIPTION OF THE INVENTION

Figure 1:
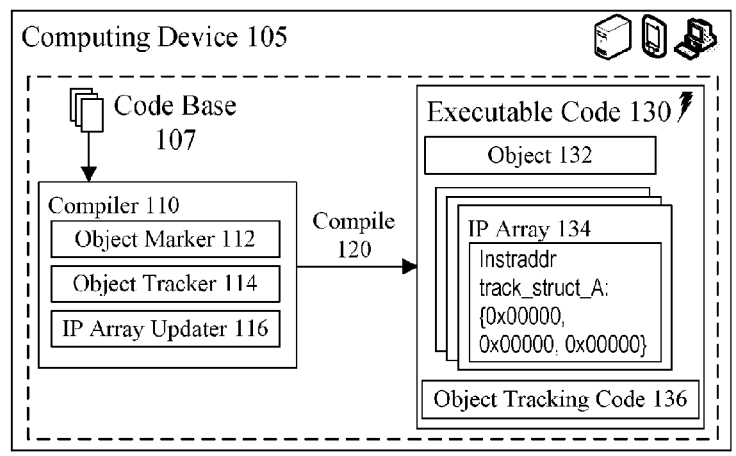
FIG. 1 is a schematic diagram illustrating a system for performing program crash debug memory tracing assisted by object tracking in accordance with an embodiment of the inventive arrangements disclosed herein.
Figure 1:
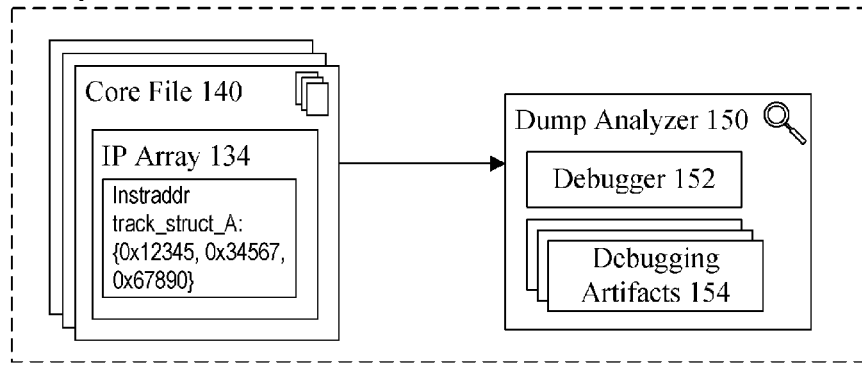

The present invention discloses a solution for increasing the immediacy in determining a point of failure after an unexpected program termination. In the solution, a user determined object is identified by a user at compile time, where the identified object is one to be tracked. The compiler introduces executable code into the source code which is able to track modifications made to the object members during run-time. During execution, the address of each instruction modifying to the object is stored in an instruction pointer (IP) array associated with the tracked object. The IP array is continuously updated during program execution when an instruction modifies a member of the tracked object. When an unexpected program termination occurs, the instruction pointer array can be presented to a debugging agent to assist in determining the instruction causing the termination. The debugging agent can be a human agent, debugging software, report generation software, and the like.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 for performing post-crash debug memory tracing assisted by object tracking in accordance with an embodiment of the inventive arrangements disclosed herein. In system 100, a computing device 105 can be utilized to compile a code base 107 for debugging purposes. Compiler 110 can be used to compile code base 107 to produce executable code 130 with object tracking code 136. Object tracking code 136 can be used at run-time to update instruction pointer (IP) array 134 which can store the addresses of instructions which modify runtime object 132. When executable code 130 terminates unexpectedly, IP array 134 can be used in analysis 170 process to quickly determine instructions causing the crash. In analysis 170, a core file 140 generated after code 130 termination can contain IP array 134. IP array 134 can include the address of the last instruction to modify object 132. Core file 140 can be utilized by a dump analyzer 150 to determine the exact source and basis of the crash. Debugger 152 can process file 140 to generate debugger artifacts 154 useful in tracing and resolving program crash issues.

Executable code 130 can include one or more executable programs, comprised of program code, data, and the like. Code 130 can include executable code in the form of executable binaries, compiled code, intermediate bytecode, libraries, and the like. Program code 130 can be comprised of object 132, IP array 134 and object tracking code 136. Object 132 can include objects, structures, non-primitive data types, and the like.

IP array 134 can store address information of instructions which modify object 132. Array 134 can be an array capable of storing a memory address of the type integer, float, double, user defined type, and the like. For instance, IP array 134 can be defined as an array of Instraddr, which can be a user defined data type able to store a memory address. Addresses stored in array 134 can include absolute addresses, relative addresses, pointers to addresses or address space, and the like. The dimension of IP array 134 can be equivalent to the number of entities in an object 132. For example, if object 132 has four members, array 134 can be created with a length of four. In one embodiment, each array element in array 134 can correspond to an entity within the tracked object. For example, an address stored in the first position in IP array 134 can identify the address of the instruction that modified the first member of the tracked object.

Compiler 110 can be utilized to create executable code 130 with object tracking capabilities. Compiler 110 can include object marker 112, object tracker 114, and IP array updater 116 components. Components 112-116 can create, insert, and compile artifacts necessary for performing run-time object tracking. Compiler 110 can be configured to include object tracking functionality into executable code 130 through command line compile options, stored compiler options, makefile configuration, environment configuration variable, and the like. Compiler 110 can include, but is not limited to, GNU C/C++ Compiler (GCC), BORLAND C/C++ compiler, VISUALAGE C/C++, JAVA compiler, and the like.

Object marker 112 can receive and tag one or more objects specified by a user. Based on a unique name identifier provided by the user, marker 112 can identify the object to be tracked. Marker 112 can tag the specified object to indicate object tracking code can be generated for the object. The tag can include compiler recognizable directives, preprocessor directives, pragmatic information, and the like. Each tagged object can be added to a list of tracked objects maintained by object marker 112.

Object tracker 114 can utilize marker 112 created list to generate object tracking program code 136 for each tracked object. Based on the determined object type, tracker 114 can generate suitable object tracking code 136. An IP array 134 can be created for each tracked object which can be used to store the addresses of instructions modifying the tracked object.

IP Array updater 116 can generate executable program code which can initialize IP array 134 prior to usage by code 136. Updater 116 can generate program code able to update IP array 134 during code 130 execution. Updater 116 generated code can be encapsulated in object tracking code 136, compiled as a separate entity, and the like. Code 136 can be marked as debug code which can be removed by performing a strip, decreasing the number of source compilations necessary during problem diagnosis.

When executable code 130 terminates unexpectedly, core file 140 can be created. Core file 140 can include an IP array 134 for each tracked object during program code 134 execution. In one embodiment, an automated debugging process can be started after program 130 termination. Based on IP array 134 information present in core file 140, dump analyzer 150 can be utilized in a debugging process. For each tracked object debugger 152 can present debugging artifacts 152. Artifacts 152 can include memory heap/stack data, symbol tables, loaded memory modules data, disassembly information, and the like.

As used herein, code base 107 can include one or more source code files, source code projects, and the like. Source code files can include files comprising of one or more programming languages such as C, C++, JAVA, and the like. Object tracking can be performed on one or more program objects residing in one or more source files. IP array 134 implementation details can vary including the use of a multi-dimensional array, an array of arrays, array of objects, and the like.

The diagrams presented herein are for illustrative purposes only, and should not be construed to limit the invention in any regard. Although x86 architecture is specifically discussed herein, other processor architectures are contemplated. The present invention can be implemented in a 32-bit address space, 64-bit address space, and the like.

Figure 2A:
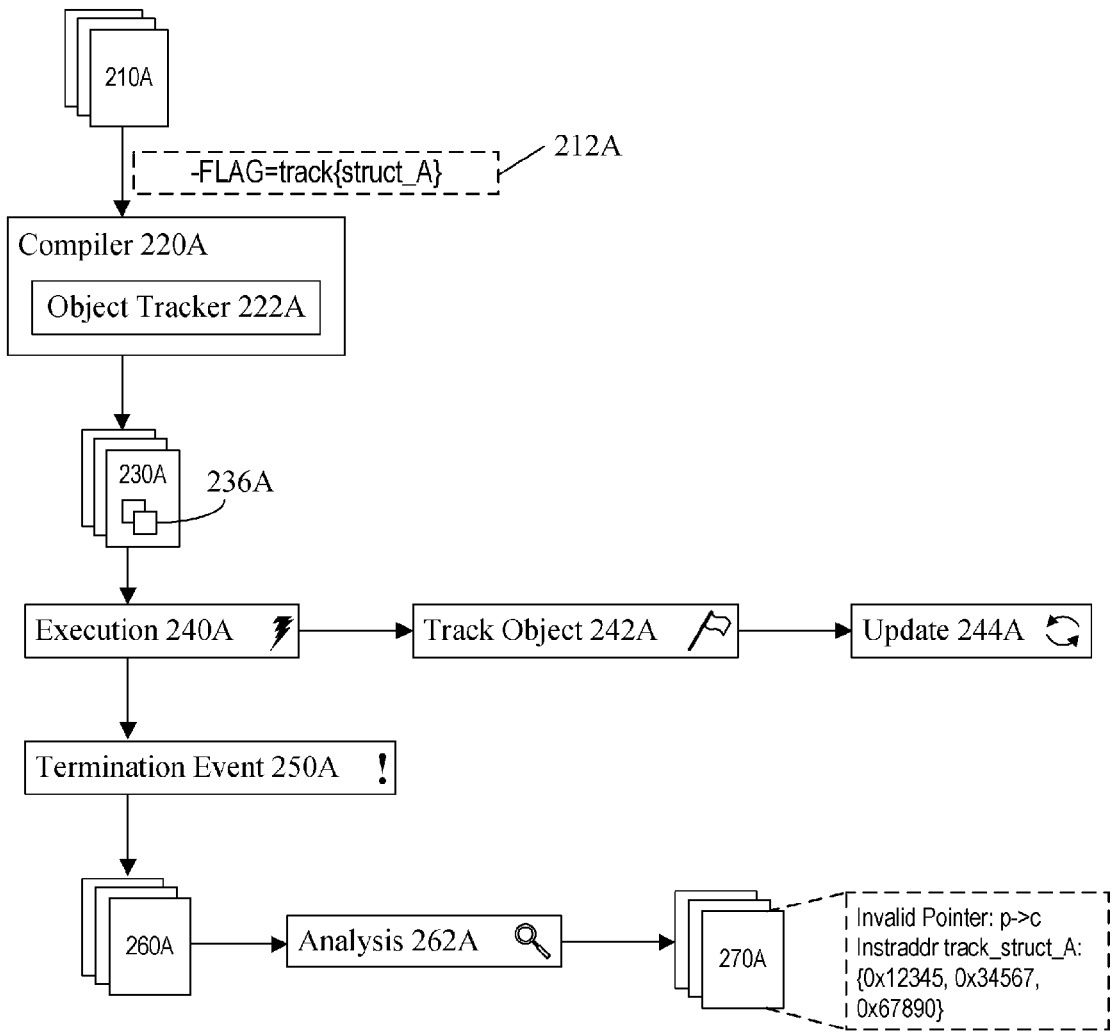
FIG. 2A is a schematic diagram illustrating a scenario for rapid memory tracing using lightweight object tracking in accordance with an embodiment of the inventive arrangements disclosed herein.

FIG. 2A is a schematic diagram illustrating a scenario 200A for rapid memory tracing using lightweight object tracking in accordance with an embodiment of the inventive arrangements disclosed herein. Scenario 200A can be performed in the context of system 100. FIG. 2B presents code 200B segments and artifacts for scenario 200A. In scenario 200A, a program code 230A with object tracking functionality can be created which can expedite point of failure debugging.

Source code 210A can be C/C++ source code with one or more structure data types. For example, structure struct_A defined in listing 210B can be tracked with object tracking functionality. Source code 210A can be compiled with object tracking functionality through the use of command line compiler options. For instance, compiler option 212A can be used track the struct_A structure. In one embodiment, object tracking can be invoked using the CFLAGS option recognized by the GNU C/C++ compiler.

Compiler 220A can process user specified compiler options and build a list of objects to track. For a tracked object, object tracker 222A can determine the functions and/or instructions which modify the tracked object. For example, compiler 220A can determine that function 220B can be used to modify structure 210B struct_A. Based on the determined modifying instructions, appropriate object tracking code 236A can be created.

Tracker 222A can generate object tracking code 236A able to determine when a modifying instruction is invoked. Tracker 222A can modify structure 210B to insert an instruction pointer (IP) array used to store instruction addresses, as shown by structure 230B. For example, tracker 222A can create and insert an instruction pointer array 232 track_struct_A. In one embodiment, tracker 222A can create and name the IP array 232 by prepending "track_" to the name of the object being tracked. Alternatively, generated IP array 232 can be uniquely named based on user determined conventions.

During execution 240A, object tracking code 236A generated by compiler 220A can be used to track objects. When an object is accessed a determination is made whether the object is being tracked. This determination can be performed by comparing the object to a list of tracked objects, identifying a tag associated with the object, and the like. If the object is a tracked object, track object 242A can be performed. If the object is modified, update 244A can be executed. Update 244A can include retrieving the address of the instruction modifying the object and storing it in the IP array. For example, compiler generated assembler code 244B of listing 240B can copy the address of the current instruction pointer to the array on the stack.

When a termination event 250A occurs, core file 260A can be automatically generated from the program code 230A. Core file 260A can include instruction pointer array, crash information, error information, and the like. For example, core file 260A can include track_struct_A populated with the address of the last instruction to modify struct_A. Analysis 262A can include the use of automated debugging and/or manual information collection. Report 270A can be generated from the aggregated data collected from core file 260A. Report 270A can present one or more access violations for a tracked object and the associated IP array storing address information for the tracked object. Utilizing 270A, memory tracing can be performed from the point of program termination to the core point of failure. For instance, based on memory addresses stored in track_struct_A, a debugging agent can trace the core point of failure to a specific loaded library, presented in listing 270B.

Figure 3:
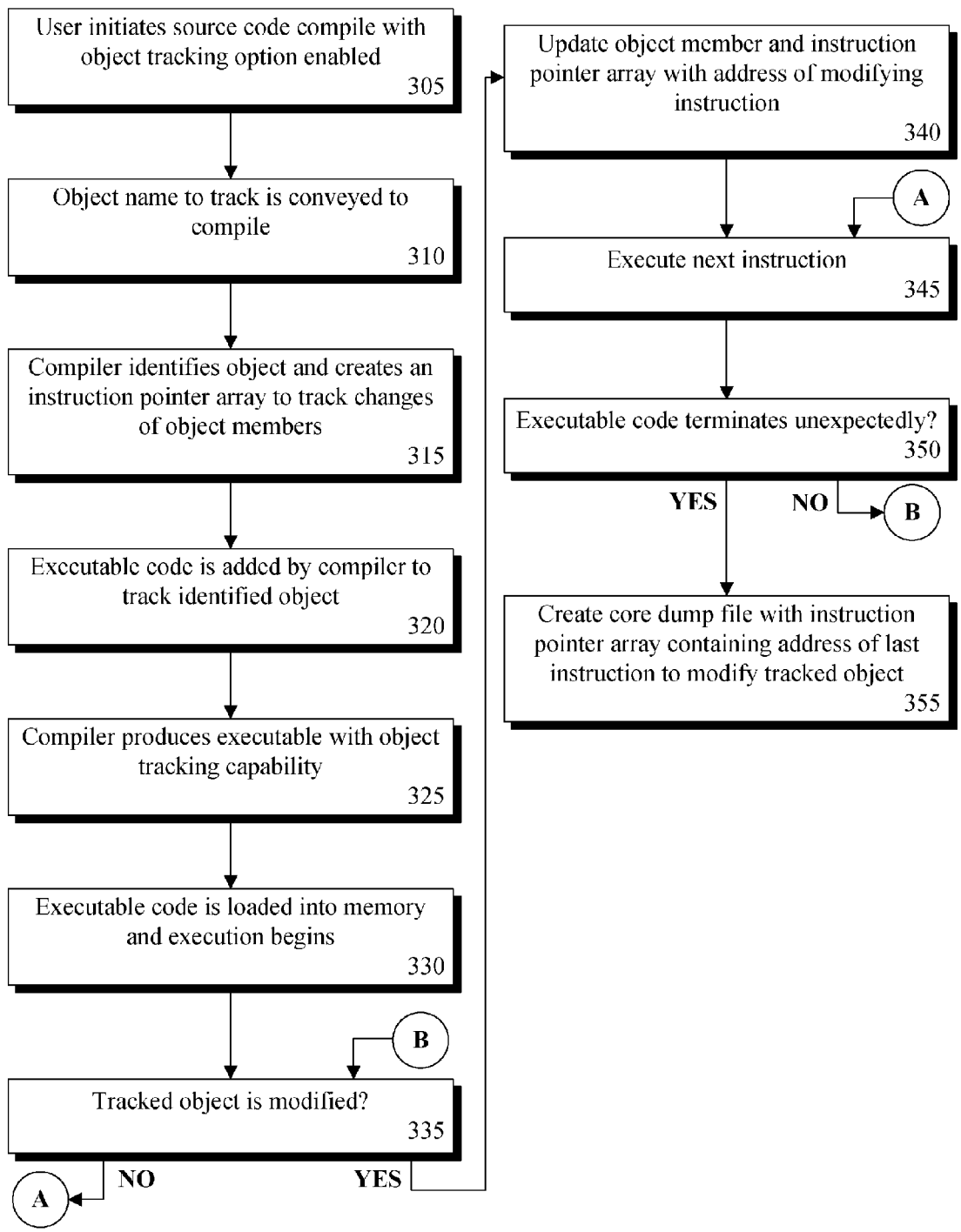
FIG. 3 is a flowchart illustrating a method for employing an array of instruction pointers which track member changes of structures in accordance with an embodiment of the inventive arrangements disclosed herein.

FIG. 3 is a schematic diagram illustrating a method 300 for utilizing an array of instruction pointers to track member changes of structures in accordance with an embodiment of the inventive arrangements disclosed herein. Method 300 can be performed in the context of system 100. In method 300, a compiler can be configured to track the addresses of instructions which modify user specified structures to aid in debugging unexpected program terminations. The compiler can add executable program code to a source file which can monitor instructions that modify members of a structure. During execution, the executable program code can update an instruction pointer array with the addresses of the instruction which modified monitored structure members. In addition to structures, other programming objects can be tracked using similar mechanisms.

In step 305, a user initiates a source code compile with object tracking option enabled. The object tracking option can be invoked via a command line flag, stored variable setting, as a set of debugging options, and the like. Object tracking can be performed on one or more structures residing in one or more source files. In step 310, the name of the user specified object is conveyed to the compiler. In step 315, the compiler identifies the user specified object and creates an instruction pointer array to track changes made to elements of the object. In step 320, executable code is added by the compiler to track identified object and update instruction pointer array. In step 325, the compiler produces an executable with object tracking capability.

In step 330, the executable code is loaded into memory and execution begins. In step 335, if the tracked object is modified the method can continue to step 340, else proceed to step 345. In step 340, the tracked object member is modified and the instruction pointer array is updated with the address of the instruction which modifies the object member. In step 345, the next instruction in the loaded executable code is performed. In step 350, if the executable code terminates unexpectedly the method can continue to step 355, else return step 335. In step 355, a core dump file is created with the instruction pointer array containing the address of the last instruction to modify the tracked object.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for debugging software object comprising:
  enabling an object tracking feature for at least one object defined in source code; and
  compiling the source code to create executable code, during compiling:
    identifying the at least one object;
    establishing an instruction pointer array for tracking changes to the identified at least one object; and
    adding executable object tracking code to the executable code;
  wherein each time the at least one object is modified at runtime when executing the created executable code, a value of the instruction pointer array is updated with an address of a modifying instruction in accordance with the executable object tracking code;
  executing the created executable code in a runtime environment;
  detecting each time the at least one object is modified in accordance with the executable object tracking code;
  for each detection of a modification of one of the objects, updating an object member and instruction pointer array with an address of the modifying instruction;
  detecting that the executable code terminates unexpectedly;
  creating a dump file in response to the unexpected termination, wherein the dump file comprises the instruction pointer array;
  establishing at least one of an environment variable and makefile variable that can be set to specify an additional switch to be passed to a compiler, wherein the additional switch enables the object tracking feature, wherein the enabling comprises establishing a value of a configurable variable N associated with the object tracking feature, wherein the established value for N represents a configurable depth for storing changes to tracked objects within the instruction pointer array.

2. The method of claim 1, further comprising:
  disabling the object tracking feature for at least one object defined in the source code;
  re-compiling the source code; and
  re-creating executable code for the source code that lacks the object tracking code and that does not establish the instruction pointer array.

3. The method of claim 1, wherein the at least one object comprises a plurality of objects, and wherein the instruction pointer array maintains addresses of modifying instructions affecting each of the objects.

4. The method of claim 1, further comprising:
  loading the instruction pointer array to an instantiated tracing program;
  presenting a trace of one of the at least one object based upon the data in the instruction pointer array to show a timed sequence of at least one modifying instruction that acted upon the one object within a user interface of the tracing program.

5. The method of claim 1, wherein the object tracking feature is a debug option applied to every individual structure of the source code when enabled.

6. The method of claim 1, wherein the object tracking feature selectively enabled for a focused debug build, where the created dump file is configured to be used to determine which struct and which member is corrupt when the executable code terminates unexpectedly.

7. A computer program product for debugging software object comprising:
    a non-transitory computer usable medium having computer usable program code embodied therewith, the computer usable program code comprising:
    computer usable program code configured to enable an object tracking feature for at least one object defined in source code, wherein the object tracking feature is a debug option applied to every individual structure of the source code when enabled; and
    computer usable program code configured to compile the source code to create executable code, said computer usable program code configured to compile further comprising:
    computer usable program code configured to identify the at least one object;
    computer usable program code configured to establish an instruction pointer array for tracking changes to the identify at least one object; and
    computer usable program code configured to add executable object tracking code to the executable code;
    wherein each time the at least one object is modified at runtime when executing the created executable code, a value of the instruction pointer array is updated with an address of a modifying instruction in accordance with the executable object tracking code;
    computer usable program code configured to execute the created executable code in a runtime environment;
    computer usable program code configured to detect each time the at least one object is modified in accordance with the executable object tracking code;
    computer usable program code configured to, for each detection of a modification of one of the objects, update an object member and instruction pointer array with an address of the modifying instruction;
    computer usable program code configured to detect that the executable code terminates unexpectedly;
    computer usable program code configured to create a dump file in response to the unexpected termination, wherein the dump file comprises the instruction pointer array; and
    computer usable program code configured to establish at least one of an environment variable and makefile variable that can be set to specify an additional switch to be passed to a compiler, wherein the additional switch enables the object tracking feature, wherein the enabling comprises establishing a value of a configurable variable N associated with the object tracking feature, wherein the established value for N represents a configurable depth for storing changes to tracked objects within the instruction pointer array.

8. The computer program product of claim 7, further comprising:
    computer usable program code configured to disable the object tracking feature for at least one object defined in the source code;
    computer usable program code configured to re-compile the source code; and
    computer usable program code configured to re-create executable code for the source code that lacks the object tracking code and that does not establish the instruction pointer array.

9. The computer program product of claim 7, wherein the at least one object comprises a plurality of objects, and wherein the instruction pointer array maintains addresses of modifying instructions affecting each of the objects.

10. The computer program product of claim 7, further comprising:
    computer usable program code configured to load the instruction pointer array to an instantiated tracing program;
    computer usable program code configured to present a trace of one of the at least one object based upon the data in the instruction pointer array to show a timed sequence of at least one modifying instruction that acted upon the one object within a user interface of the tracing program.

11. The computer program product of claim 7, wherein the object tracking feature selectively enabled for a focused debug build, where the created dump file is configured to be used to determine which structure and which member is corrupt when the executable code terminates unexpectedly.

12. A system for debugging software object comprising:
    at least one processor;
    at least one non-transitory storage medium;
    program instructions stored in the at least one non-transitory storage medium, said program instructions being executable by said at least one processor to:
    enable an object tracking feature for at least one object defined in source code; and
    compile the source code to create executable code, during compiling said program instructions:
    identifying the at least one object;
    establishing an instruction pointer array for tracking changes to the identified at least one object; and
    adding executable object tracking code to the executable code;
wherein each time the at least one object is modified at runtime when executing the created executable code, a value of the instruction pointer array is updated with an address of a modifying instruction in accordance with the executable object tracking code;
    execute the created executable code in a runtime environment;
    detect each time the at least one object is modified in accordance with the executable object tracking code;
    for each detection of a modification of one of the objects, update an object member and instruction pointer array with an address of the modifying instruction;
    detect that the executable code terminates unexpectedly;
    create a dump file in response to the unexpected termination, wherein the dump file comprises the instruction pointer array; and
    establish at least one of an environment variable and makefile variable that can be set to specify an additional switch to be passed to a compiler, wherein the additional switch enables the object tracking feature, wherein the enabling comprises establishing a value of a configurable variable N associated with the object tracking feature, wherein the established value for N represents a configurable depth for storing changes to tracked objects within the instruction pointer array.

13. The system of claim 12, wherein the at least one object comprises a plurality of objects, and wherein the instruction pointer array maintains addresses of modifying instructions affecting each of the objects, wherein the object tracking feature is a debug option applied to every individual structure of the source code when enabled.

* * * * *